US009524723B2

(12) United States Patent
Azumatani et al.

(10) Patent No.: US 9,524,723 B2
(45) Date of Patent: Dec. 20, 2016

(54) INFORMATION PROCESSING APPARATUS AND CONTROL METHOD

(71) Applicant: PANASONIC INTELLECTUAL PROPERTY MANAGEMENT CO., LTD., Osaka (JP)

(72) Inventors: Yasushi Azumatani, Osaka (JP); Takayuki Inui, Kyoto (JP); Tomoyuki Okada, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/644,044

(22) Filed: Mar. 10, 2015

(65) Prior Publication Data

US 2015/0187363 A1 Jul. 2, 2015

Related U.S. Application Data

(63) Continuation of application No. PCT/JP2013/003887, filed on Jun. 21, 2013.

(30) Foreign Application Priority Data

Dec. 17, 2012 (JP) .................................. 2012-274289

(51) Int. Cl.
*G10L 19/00* (2013.01)
*G10L 19/008* (2013.01)
(Continued)

(52) U.S. Cl.
CPC ........... *G10L 19/008* (2013.01); *G10L 19/005* (2013.01); *H04L 12/6418* (2013.01);
(Continued)

(58) Field of Classification Search
CPC ........ G10L 19/005; G10L 15/30; G10L 19/02;
G10L 19/00; G10L 19/008; G10L 19/018;
G10L 19/24; H03M 13/09; H03M
13/1154; H03M 13/1515; H03M 13/036;
H04N 21/41407; H04N 21/23614; H04N
21/2362; H04N 21/2381; H04N 21/2383;
H04L 1/0048; H04L 1/006; H04L 1/0071;
H04L 29/06027
(Continued)

(56) References Cited

U.S. PATENT DOCUMENTS 7,505,889 B2    3/2009  Salmonsen et al.
7,714,752 B2 *  5/2010  Kadono ............. G11B 20/1426
                                         341/106
(Continued)

FOREIGN PATENT DOCUMENTS

JP    2007-074529 A    3/2007
JP    2007-233620 A    9/2007
(Continued)

OTHER PUBLICATIONS

Extended European Search Report issued in Application No. 13864826.6 dated Feb. 12, 2016.
(Continued)

*Primary Examiner* — Vijay B Chawan
(74) *Attorney, Agent, or Firm* — McDermott Will & Emery LLP

(57) ABSTRACT

An information processing apparatus detects a coding method of an audio signal to be reproduced as a target coding method, selects one of a first control and a second control based on the target coding method and decoding compatibility information stored in a storage unit, and performs the selected one of the first control and the second control, the first control being for obtaining the audio signal from an external storage; decoding the obtained audio signal; and transmitting the decoded audio signal to a
(Continued)

speaker apparatus, the second control being for causing: the external storage to directly transmit the audio signal to the speaker apparatus; and the speaker apparatus to decode the audio signal.

15 Claims, 10 Drawing Sheets

(51) Int. Cl.
*G10L 19/005* (2013.01)
*H04L 12/64* (2006.01)
*H04R 27/00* (2006.01)
*H04N 21/436* (2011.01)
*H04N 21/439* (2011.01)

(52) U.S. Cl.
CPC ............ *H04R 27/00* (2013.01); *G10L 19/00* (2013.01); *H04N 21/439* (2013.01); *H04N 21/43615* (2013.01); *H04R 2201/028* (2013.01); *H04R 2227/003* (2013.01); *H04R 2227/005* (2013.01); *H04R 2420/07* (2013.01)

(58) Field of Classification Search
USPC ............ 704/270.1, 500–504, 212, 270, 275; 341/106, 59, 65, 67; 370/312, 432; 375/240; 455/569.1; 714/758, 779
See application file for complete search history.

(56) References Cited

U.S. PATENT DOCUMENTS

| | | | |
|---|---|---|---|
| 8,023,525 B2* | 9/2011 | Oh | H03M 13/271 370/312 |
| 8,456,188 B2 | 6/2013 | Nakajima et al. | |
| 8,587,723 B2 | 11/2013 | Nakajima et al. | |
| 8,670,645 B2 | 3/2014 | Nakajima et al. | |
| 2002/0154774 A1* | 10/2002 | Oomen | H04K 1/00 704/E19.01 |
| 2002/0184373 A1* | 12/2002 | Maes | G10L 15/30 709/228 |
| 2005/0286481 A1 | 12/2005 | Fadell | |
| 2006/0041431 A1* | 2/2006 | Maes | G10L 15/30 704/270.1 |
| 2006/0069550 A1* | 3/2006 | Todd | G10L 19/005 704/212 |
| 2007/0053514 A1 | 3/2007 | Imai et al. | |
| 2009/0019492 A1* | 1/2009 | Grasset | G11B 27/034 725/45 |
| 2010/0066919 A1 | 3/2010 | Nakajima et al. | |
| 2010/0129062 A1 | 5/2010 | Nakajima et al. | |
| 2010/0190532 A1* | 7/2010 | Sampat | H04W 8/245 455/569.1 |
| 2010/0289530 A1 | 11/2010 | Nakajima et al. | |
| 2011/0026581 A1* | 2/2011 | Ojala | G10L 19/24 375/240 |
| 2011/0035514 A1 | 2/2011 | Tachikawa et al. | |
| 2013/0055049 A1* | 2/2013 | Murakami | H03M 13/1154 714/779 |
| 2013/0311857 A1* | 11/2013 | Murakami | H03M 13/1154 714/786 |
| 2014/0136921 A1* | 5/2014 | Murakami | H03M 13/1154 714/758 |
| 2014/0304758 A1 | 10/2014 | Tanaka et al. | |
| 2015/0221312 A1* | 8/2015 | Lynch | G10L 19/02 704/500 |

FOREIGN PATENT DOCUMENTS

| | | |
|---|---|---|
| JP | 2007-288723 A | 11/2007 |
| JP | 2008-005254 A | 1/2008 |
| JP | 2008-505536 A | 2/2008 |
| JP | 2008-236694 A | 10/2008 |
| JP | 2009-049498 A | 3/2009 |
| JP | 2009-060512 A | 3/2009 |
| JP | 2011-035841 A | 2/2011 |
| WO | 2006/007084 A1 | 1/2006 |
| WO | 2008/056718 A1 | 5/2008 |
| WO | 2013/061366 A1 | 5/2013 |

OTHER PUBLICATIONS

International Search Report issued in International Application No. PCT/JP2013/003887 dated Jul. 23, 2013, with English translation.

* cited by examiner

FIG. 3

| File name | Song title | Coding method |
|---|---|---|
| audio1.mp3 | song1 | MP3 |
| audio2.mp3 | song2 | MP3 |
| audio3.aac | song3 | AAC |
| audio4.wav | song4 | WAV |
| audio5.flac | song5 | FLAC |
| audio6.ogg | song6 | Ogg |
| audio7.wma | song7 | WMA |

FIG. 4

| Coding method | Information processing apparatus | First speaker apparatus | Second speaker apparatus |
|---|---|---|---|
| MP3 | ○ | ○ | ○ |
| AAC | ○ | × | × |
| WAV | ○ | × | × |
| FLAC | × | ○ | ○ |
| Ogg | × | ○ | ○ |
| WMA | × | ○ | ○ |

FIG. 5

| Communication method | First speaker apparatus | Second speaker apparatus |
|---|---|---|
| Bluetooth | ○ | ○ |
| DLNA | ○ | × |

FIG. 6

| Coding method | First speaker apparatus | Second speaker apparatus |
|---|---|---|
| MP3 | ○ | ○ |
| AAC | ○ | ○ |
| WAV | ○ | ○ |
| FLAC | ○ | × |
| Ogg | ○ | × |
| WMA | ○ | × |

INFORMATION PROCESSING APPARATUS AND CONTROL METHOD

CROSS REFERENCE TO RELATED APPLICATIONS

This is a continuation application of PCT International Application No. PCT/JP2013/003887 filed on Jun. 21, 2013, designating the United States of America, which is based on and claims priority of Japanese Patent Application No. 2012-274289 filed on Dec. 17, 2012. The entire disclosures of the above-identified applications, including the specifications, drawings and claims are incorporated herein by reference in their entirety.

FIELD

The present disclosure relates to an information processing apparatus that controls reproducing, through a speaker apparatus, an audio signal stored in an external storage, and to a control method for the information processing apparatus.

BACKGROUND

Patent Literature (PTL) 1 (Japanese Unexamined Patent Application Publication No. 2009-060512) discloses a mobile terminal that allows the user to continuously view a content item reproduced by another mobile terminal through a content reproduction apparatus.

SUMMARY

In recent years, many users have enjoyed music by downloading reproduction content items to external storages including mobile terminals, personal computers, and network-attached storages (NAS).

Here, some users play back, through network speakers, reproduction content items stored in the external storages according to communication methods including Bluetooth® protocols and Digital Living Network Alliance® (DLNA) protocols.

Whether or not a reproduction content item can be reproduced is typically determined according to whether or not a network speaker conforms to the content protocol of the reproduction content item.

The present disclosure provides an information processing apparatus that allows a network speaker to easily reproduce a reproduction content item even when the network speaker does not conform to the content protocol of the reproduction content item, and a control method for the information processing apparatus.

In order to solve the problem, an information processing apparatus according to an aspect of the present disclosure controls reproduction of an audio signal through a speaker apparatus having a function of decoding the audio signal, the audio signal being stored in an external storage, and includes: a detection unit configured to detect a coding method of the audio signal as a target coding method; a decoding unit configured to decode the audio signal; a storage unit in which decoding compatibility information is stored, the decoding compatibility information indicating whether or not the target coding method is a method in which each of the decoding unit and the speaker apparatus can decode the audio signal; a communication unit configured to communicate with the external storage and the speaker apparatus; and a control unit configured to select one of a first control and a second control based on the target coding method and the decoding compatibility information, and perform the selected one of the first control and the second control, the first control being for causing: the communication unit to obtain the audio signal from the external storage; the decoding unit to decode the obtained audio signal; and the communication unit to transmit the decoded audio signal to the speaker apparatus, the second control being for causing: the external storage to directly transmit the audio signal to the speaker apparatus; and the speaker apparatus to decode the audio signal.

BRIEF DESCRIPTION OF DRAWINGS

FIG. 3 is a diagram indicating an example of an audio signal list according to Embodiment 1.

FIG. 4 is a diagram indicating an example of a decoding correspondence table according to Embodiment 1.

FIG. 5 is a diagram indicating an example of a communication method correspondence table according to Embodiment 1.

FIG. 6 is a diagram indicating coding methods and whether or not an audio signal coded according to each of the coding methods can be reproduced.

Figure 1:
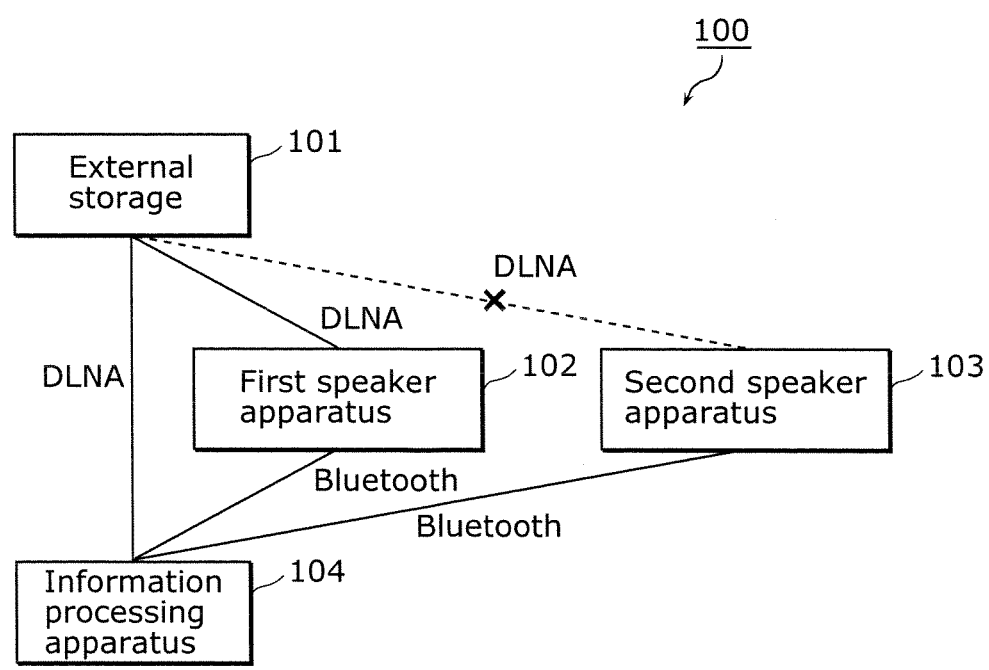
FIG. 1 schematically illustrates a configuration of an audio signal reproduction system according to Embodiment 1.

DESCRIPTION OF EMBODIMENTS (Underlying Knowledge Forming Basis of the Present Disclosure)

As described in the Background, PTL 1 discloses a mobile terminal that allows the user to continuously view a content item reproduced by another mobile terminal through a content reproduction apparatus.

The mobile terminal disclosed in PTL 1 identifies one or more reproduction apparatuses in a predetermined region that conform to the content protocol of the reproduction content item, and transmits data of the reproduction content item to the identified reproduction apparatuses. Furthermore, the mobile terminal identifies the reproduction apparatuses that conform to the content protocol, based on a content transition table, and displays the identified reproduction apparatuses as candidate reproduction apparatuses. The user can select a desired reproduction apparatus from among the candidate reproduction apparatuses so that he/she can enjoy the continued viewing of the content item.

Here, the content protocol is a protocol relating to content items, such as a reproduction method, a data format, a data compression method, or a communication protocol.

Protocols of reproduction methods include a standard of bit rate information. Data formats and data compression methods for content items include Advanced Audio Coding (AAC) relating to music, RIFF Waveform Audio Format (WAV), and MPEG Audio Layer-3 (MP3).

Protocols (communication protocols) of communication methods include Bluetooth®, Felica®, Power Line Communication (PLC), Wireless Local Area Network (LAN), Infrared Data Association (IrDA), Infrared Simple Shot (IrSS), and Wideband Code Division Multiple Access® (WCDMA).

The reproduction apparatus that is a candidate apparatus to be selected by the user according to the configuration of PTL 1 is limited to a reproduction apparatus that conforms to a content protocol of a mobile terminal. Furthermore, the configuration disclosed in PTL 1 is aiming at not transmission of a reproduction content item stored in a personal computer or a NAS that is connected to a network, but only transmission of a reproduction content item stored in a mobile terminal.

In another known configuration, a reproduction content item is downloaded to external storages such as a mobile terminal, a personal computer, and a NAS, the reproduction content item stored in the external storage such as the mobile terminal is transmitted to a network speaker, and the network speaker is caused to reproduce the reproduction content item.

However, when the network speaker does not conform to the content protocol of the reproduction content item under the configuration, the network speaker in principle cannot reproduce the reproduction content item.

The present disclosure provides an information processing apparatus capable of easily reproducing a reproduction content item even when a network speaker does not conform to the content protocol of the reproduction content item, and a control method for the information processing apparatus.

In other words, the present disclosure provides an information processing apparatus capable of easily reproducing the reproduction content item, without the user aware of the compatibility of the network speaker to the content protocol.

The information processing apparatus according to an aspect of the present disclosure controls reproduction of an audio signal through a speaker apparatus having a function of decoding the audio signal, the audio signal being stored in an external storage, and includes: a detection unit configured to detect a coding method of the audio signal as a target coding method; a decoding unit configured to decode the audio signal; a storage unit in which decoding compatibility information is stored, the decoding compatibility information indicating whether or not the target coding method is a method in which each of the decoding unit and the speaker apparatus can decode the audio signal; a communication unit configured to communicate with the external storage and the speaker apparatus; and a control unit configured to select one of a first control and a second control based on the target coding method and the decoding compatibility information, and perform the selected one of the first control and the second control, the first control being for causing: the communication unit to obtain the audio signal from the external storage; the decoding unit to decode the obtained audio signal; and the communication unit to transmit the decoded audio signal to the speaker apparatus, the second control being for causing: the external storage to directly transmit the audio signal to the speaker apparatus; and the speaker apparatus to decode the audio signal.

Under such a first control, the speaker apparatus selected by the user can reproduce the audio signal that cannot be decoded by the speaker apparatus.

Even when the external storage and the speaker apparatus selected by the user cannot directly communicate, the speaker apparatus can reproduce the audio signal under the first control.

Furthermore, the speaker apparatus selected by the user can reproduce the audio signal that cannot be decoded by the information processing apparatus under the second control.

Thus, the speaker apparatus can easily reproduce the audio signal, without the user aware of whether or not (i) the coding method of the audio signal is a method in which the speaker apparatus can decode the audio signal and (ii) the speaker apparatus can communicate with the external storage.

Specifically, for example, the control unit may be configured to perform: the first control when the decoding compatibility information indicates that the target coding method is the method in which the decoding unit can decode the audio signal; and the second control when the decoding compatibility information indicates that the target coding method is (i) a method in which the decoding unit cannot decode the audio signal and (ii) the method in which the speaker apparatus can decode the audio signal.

Furthermore, the control unit may be configured to perform the first control when the decoding compatibility information indicates that the target coding method is the method in which the decoding unit and the speaker apparatus can decode the audio signal.

As such, the first control may be prioritized over the second control.

Furthermore, the control unit may be configured to perform the second control when the decoding compatibility information indicates that the target coding method is the method in which the decoding unit and the speaker apparatus can decode the audio signal.

As such, the second control may be prioritized over the first control.

Furthermore, the communication unit may be configured to communicate according to: a first communication method so that the communication unit transmits the decoded audio signal to the speaker apparatus under the first control; and a second communication method so that the external storage directly transmits the audio signal to the speaker apparatus under the second control, communication compatibility information may be further stored in the storage unit, the communication compatibility information indicating whether or not the speaker apparatus can communicate according to each of the first communication method and the second communication method, and the control unit may be configured to select one of the first control and the second control based on the target coding method, the decoding compatibility information, and the communication compatibility information, and perform the selected one of the first control and the second control.

As such, the information processing apparatus can perform the first control and the second control, after determining whether or not the speaker apparatus selected by the user conforms to a predetermined communication method.

Furthermore, the control unit may be configured to perform the first control when the communication compatibility information indicates that the target coding method is the method in which both the decoding unit and the speaker apparatus can decode the audio signal and that the speaker apparatus can communicate according to both the first communication method and the second communication method.

As such, the first control may be prioritized over the second control.

Furthermore, the control unit may be configured to perform the second control when the communication compatibility information indicates that the target coding method is the method in which both the decoding unit and the speaker apparatus can decode the audio signal and that the speaker apparatus can communicate according to both the first communication method and the second communication method.

As such, the second control may be prioritized over the first control.

Furthermore, the information processing apparatus may further include: an input unit configured to receive a selection of the speaker apparatus by a user; and a display unit, wherein the speaker apparatus may be one speaker apparatus selected by the user through the input unit from among candidate speaker apparatuses displayed on the display unit, and the control unit may be configured to perform a control for: selecting a speaker apparatus that can communicate according to the first communication method or that can decode the audio signal and communicate according to the second communication method, from among speaker apparatuses that can communicate with the communication unit, based on the decoding compatibility information and the communication compatibility information, and displaying an icon indicating the selected speaker apparatus as one of the candidate speaker apparatuses on the display unit, when the decoding compatibility information indicates that the target coding method is the method in which the decoding unit can decode the audio signal; and selecting a speaker apparatus that can decode the audio signal and communicate according to the second communication method from among the speaker apparatuses based on the decoding compatibility information and the communication compatibility information, and displaying an icon indicating the selected speaker apparatus as an other one of the candidate speaker apparatuses on the display unit, when the decoding compatibility information indicates that the target coding method is a method in which the decoding unit cannot decode the audio signal.

Accordingly, the user can only select the speaker apparatus that can reproduce the audio signal. Since the speaker apparatus selected by the user always reproduces the audio signal, the user can comfortably enjoy music.

Furthermore, the information processing apparatus may further include: an input unit configured to receive a selection of the speaker apparatus by a user; and a display unit, wherein the speaker apparatus may be one speaker apparatus selected by the user through the input unit from among candidate speaker apparatuses displayed on the display unit, and the control unit may be configured to perform a control for displaying icons indicating speaker apparatuses that can communicate with the communication unit as corresponding ones of the candidate speaker apparatuses on the display unit.

Furthermore, the control unit may be configured to, when the speaker apparatus can reproduce the audio signal under both the first control and the second control, perform a control for displaying a common icon indicating the speaker apparatus as one of the candidate speaker apparatuses on the display unit.

Accordingly, one icon corresponding to one speaker apparatus is displayed on the display unit regardless of a control method. Thus, the user can enjoy music without being aware of the communication method.

Furthermore, the control unit may be configured to, when the control unit cannot perform any one of the first control and the second control, perform a control for displaying that the control unit cannot perform any one of the first control and the second control on the display unit.

Accordingly, the information processing apparatus can convey a message indicating that the audio signal cannot be reproduced.

Furthermore, the first communication method may be wireless communication using a Bluetooth® protocol, and the second communication method may be wireless communication using a DLNA® protocol.

Furthermore, a control method according to an aspect of the present disclosure is for reproducing an audio signal through a speaker apparatus having a function of decoding the audio signal, the audio signal being stored in an external storage, the control method being performed by an information processing apparatus, wherein the information processing apparatus can communicate with the external storage and the speaker apparatus, and includes a storage unit in which decoding compatibility information is stored, the decoding compatibility information indicating whether or not the target coding method is a method in which each of the decoding unit and the speaker apparatus can decode the audio signal, the control method includes selecting one of a first control and a second control based on the target coding method and the decoding compatibility information, and performing the selected one of the first control and the second control, the first control being for obtaining the audio signal from the external storage; decoding the obtained audio signal; and transmitting the decoded audio signal from the information processing apparatus to the speaker apparatus, the second control being for causing: the external storage to directly transmit the audio signal to the speaker apparatus; and the speaker apparatus to decode the audio signal.

These general or specific aspects of the present disclosure may be implemented by a system, a method, an integrated circuit, a computer program, a computer-readable recording medium, such as a CD-ROM, or an arbitrary combination of the system, the method, the integrated circuit, the computer program, and the recording medium.

The embodiments according to the present disclosure will be described appropriately with reference to the drawings. The detailed description more than necessary may be omitted. For example, detailed description of well-known facts and overlapping description of substantially identical configurations may be omitted. These prevent the description from being redundant and make a person skilled in the art to easily understand the description.

The Applicant provides the description and the drawings for the person skilled in the art to easily understand the present disclosure, and does not intend to limit the subject matter of the description into the scope of the claims.

Embodiment 1

An audio signal reproduction system according to Embodiment 1 will be described with reference to the drawings.

[1. Configuration of Audio Signal Reproduction System]
[1-1. Overall Configuration]

FIG. 1 schematically illustrates a configuration of an audio signal reproduction system 100 according to Embodiment 1.

As illustrated in FIG. 1, the audio signal reproduction system 100 includes an external storage 101 that stores an audio signal, a first speaker apparatus 102 and a second speaker apparatus 103 that reproduce the audio signal, and an information processing apparatus 104.

The external storage 101 is a NAS, and the first speaker apparatus 102 is a stereo component system according to Embodiment 1. Furthermore, the second speaker apparatus 103 is an audio stereo system, and the information processing apparatus 104 is a smartphone.

However, these apparatuses are not limited to such examples. For example, the external storage 101 may be not limited to a NAS but any device as long as an audio signal can be stored and has a communication function for communicating with an external device. Furthermore, the first speaker apparatus 102 and the second speaker apparatus 103 may be not limited to a stereo component system and an audio stereo system but any audio apparatuses as long as they have a communication function, for example, network speakers. The information processing apparatus 104 may be not limited to a smartphone but any apparatus as long as it can control the external storage 101, the first speaker apparatus 102, and the second speaker apparatus 103.

As illustrated in FIG. 1, the information processing apparatus 104 can communicate with the first speaker apparatus 102 and the second speaker apparatus 103 according to a Bluetooth protocol. Furthermore, the external storage 101 can communicate with the information processing apparatus 104 and the first speaker apparatus 102 according to a DLNA protocol. The external storage 101 and the second speaker apparatus 103 cannot directly communicate with each other.

In the following description, the Bluetooth protocol may be referred to as a first communication method, and the DLNA protocol may be referred to as a second communication method.

The audio signal reproduction system 100 is a system with which the user plays back the audio signal stored in the external storage 101 through a desired speaker apparatus. The user selects an audio signal to be reproduced and a speaker apparatus for reproducing the audio signal, through the information processing apparatus 104. Accordingly, the user can play back the audio signal stored in the external storage 101 through a desired speaker apparatus.

Next, the specific configuration of the audio signal reproduction system 100 will be described.

Figure 2:
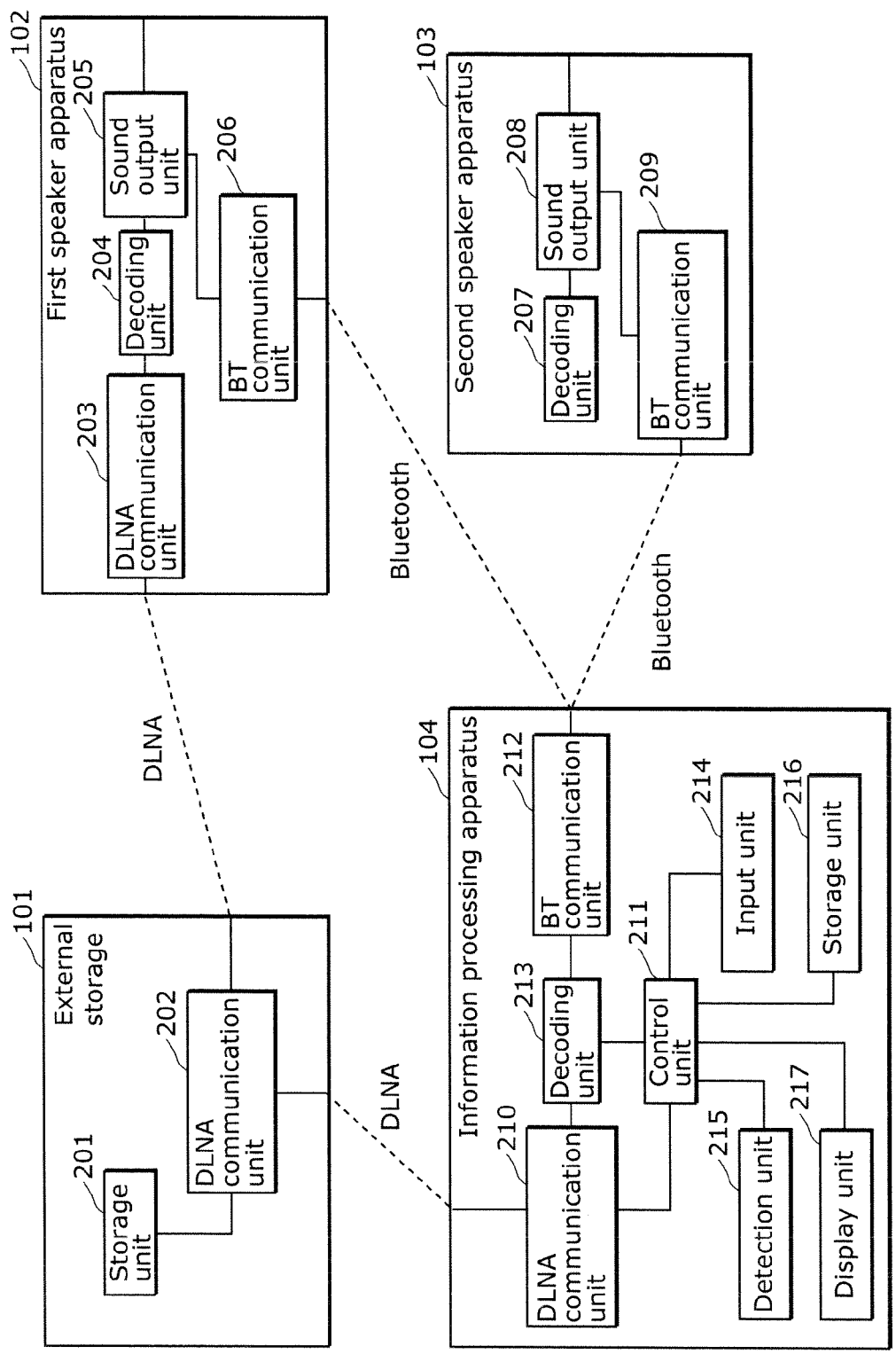
FIG. 2 is a block diagram of the audio signal reproduction system according to Embodiment 1.

FIG. 2 is a block diagram illustrating the detailed configuration of the audio signal reproduction system 100.

The external storage 101 includes a storage unit 201 and a DLNA communication unit 202.

In the storage unit 201, audio signals and a list of the audio signals (audio signal list) are stored. The storage unit 201 is, for example, a hard disc drive (HDD). The details of the audio signal list will be described later.

The DLNA communication unit 202 is a communication unit that communicates with external devices (the first speaker apparatus 102 and the information processing apparatus 104) according to the DLNA protocol.

The first speaker apparatus 102 includes a DLNA communication unit 203, a decoding unit 204, a sound output unit 205, and a Bluetooth (hereinafter abbreviated as "BT") communication unit 206.

The DLNA communication unit 203 is a communication unit that communicates with an external device (the external storage 101) according to the DLNA protocol, similarly as the DLNA communication unit 202 of the external storage 101.

The decoding unit 204 decodes the audio signal obtained from the external storage 101 through the DLNA communication unit 203.

The sound output unit 205 outputs the audio signal decoded by the decoding unit 204.

The BT communication unit 206 is a communication unit that communicates with an external device (the information processing apparatus 104) according to the Bluetooth protocol.

The second speaker apparatus 103 includes a decoding unit 207, a sound output unit 208, and a BT communication unit 209.

The decoding unit 207 decodes the audio signal.

The sound output unit 208 outputs the audio signal decoded by the decoding unit 207.

The BT communication unit 209 is a communication unit that communicates with an external device (the information processing apparatus 104) according to the Bluetooth protocol.

The information processing apparatus 104 includes a DLNA communication unit 210, a control unit 211, a BT communication unit 212, a decoding unit 213, an input unit 214, a detection unit 215, a storage unit 216, and a display unit 217.

The input unit 214 receives a selection of a speaker apparatus (one of the first speaker apparatus 102 and the second speaker apparatus 103) by the user. Furthermore, the input unit 214 receives a selection of an audio signal to be played back by the user. Here, the audio signal to be played back means at least one audio signal selected by the user from among the audio signals stored in the external storage 101. The input unit 214 is, for example, a touch panel superimposed on the display unit 217 of the information processing apparatus 104, or an input button of the information processing apparatus 104.

The detection unit 215 detects a coding method of the audio signal that is selected by the user and is to be reproduced through the input unit 214, as a target coding method. The coding method is herein a content protocol.

The decoding unit 213 decodes the audio signal selected by the user through the input unit 214.

In the storage unit 216, a decoding correspondence table (decoding compatibility information) and a communication method correspondence table (communication compatibility information) are stored. The storage unit 216 is, for example, a flash memory or an Electrically Erasable Programmable Read-Only Memory (EEPROM). The decoding correspondence table and the communication method correspondence table will be described in detail later.

The DLNA communication unit 210 is a communication unit that communicates with an external device (the external storage 101) according to the DLNA protocol.

The BT communication unit 212 is a communication unit that communicates with external devices (the first speaker apparatus 102 and the second speaker apparatus 103) according to the Bluetooth protocol.

In the following description, a combination of the DLNA communication unit 210 and the BT communication unit 212 may be referred to as a communication unit 218. In other words, the communication unit 218 can communicate according to the Bluetooth protocol (the first communication method) and the DLNA protocol (the second communication method), and communicates with the external storage 101, the first speaker apparatus 102, and the second speaker apparatus 103.

The control unit 211 selects one of the first control and the second control based on the target coding method detected by the detection unit 215, the decoding correspondence table, and the communication method correspondence table, and performs the selected control. In other words, the control unit 211 selectively performs the first control and the second control.

Here, under the first control, the control unit 211 first causes the communication unit 218 (the DLNA communication unit 210) to obtain the audio signal to be reproduced from the external storage 101. Next, the control unit 211 causes the decoding unit 213 to decode the audio signal obtained by the communication unit 218. Finally, the control unit 211 causes the communication unit 218 to transmit the audio signal decoded by the decoding unit 213 to the speaker apparatus selected by the user through the input unit 214.

In other words, the first control is a control in which the information processing apparatus 104 decodes by itself the audio signal to be reproduced and transmits the decoded audio signal to the speaker apparatus selected by the user so that the speaker apparatus can reproduce the audio signal.

In contrast, under the second control, the control unit 211 causes the external storage 101 to directly transmit the audio signal to be reproduced to the speaker apparatus selected by the user, and the speaker apparatus to decode the audio signal.

In other words, the second control is a control in which the information processing apparatus 104 causes the speaker apparatus selected by the user to decode and reproduce the audio signal without decoding the audio signal by itself.

The determination criterion on whether the control unit 211 performs the first control or the second control will be described later.

The decoding performed by each of the decoding units 204, 207, and 213 conforms to a coding method (content protocol). According to Embodiment 1, the DLNA communication units 202, 203, and 210, and the BT communication units 206, 209, and 212 perform the coding and the decoding according to a coding method (content protocol). The detailed description of such operations will be omitted.

The display unit 217 is, for example, a liquid crystal display (LCD) and an organic electroluminescence (EL) display. A selection screen for allowing a user to select an audio signal is displayed on the display unit 217. Furthermore, a selection screen for allowing a user to select a speaker apparatus that reproduces an audio signal to be reproduced is displayed on the display unit 217. The control unit 211 displays such a selection screen on the display unit 217.

[1-2. Audio Signal List]

Next, the audio signal list of audio signals stored in the storage unit 201 of the external storage 101 will be described.

FIG. 3 is a diagram indicating an example of an audio signal list.

The audio signal list includes file names, song titles, and coding methods (content protocols) of audio signals.

Specifically, the file name "audio1.mp3", the song title "song1", and the coding method "MP3" are associated with each other in the audio signal list in FIG. 3. Similarly, the file name "audio2.mp3", the song title "song2", and the coding method "MP3", and the file name "audio3.aac", the song title "song3", and the coding method "AAC (Advanced Audio Coding)" are associated with each other. Furthermore, the file name "audio4.wav", the song title "song4", and the coding method "WAV (RIFF waveform Audio Format)", and the file name "audio5.flac", the song title "song5", and the coding method "FLAC (Free Lossless Audio Codec)" are associated with each other. Furthermore, the file name "audio6.ogg", the song title "song6", and the coding method "Ogg", and the file name "audio7.wma", the song title "song7", and the coding method "WMA (Windows® Media Audio) are associated with each other.

[1-3. Decoding Correspondence Table]

Next, the decoding correspondence table stored in the storage unit 216 of the information processing apparatus 104 will be described.

FIG. 4 is a diagram indicating an example of the decoding correspondence table.

The decoding correspondence table is information indicating whether or not each of the coding methods is a method in which each of the decoding unit 213 and speaker apparatuses (the decoding unit 204 of the first speaker apparatus 102 and the decoding unit 207 of the second speaker apparatus 103) can decode an audio signal. In other words, the decoding correspondence table is information indicating whether or not the target coding method is a method in which each of the decoding unit 213 and the speaker apparatuses can decode an audio signal.

In the decoding correspondence table in FIG. 4, the circle indicates that each of the information processing apparatus 104, the first speaker apparatus 102, and the second speaker apparatus 103 can decode the audio signal coded according to the listed coding method. Similarly, the x-mark indicates that each of the apparatuses cannot decode the audio signal coded according to the listed coding method.

Specifically, the decoding correspondence table in FIG. 4 indicates that the decoding unit 213 of the information processing apparatus 104 can decode the audio signal coded according to each of the coding methods of the MP3, the AAC, and the WAV. Furthermore, the decoding correspondence table indicates that the decoding unit 213 of the information processing apparatus 104 cannot decode the audio signal coded according to each of the coding methods of the FLAC, the Ogg, and the WMA.

Similarly, the decoding correspondence table indicates that the decoding unit 204 of the first speaker apparatus 102 can decode the audio signal coded according to each of the coding methods of the MP3, the FLAC, the Ogg, and the WMA, whereas it cannot decode the audio signal coded according to each of the coding methods of the AAC and the WAV.

Similarly, the decoding correspondence table indicates that the decoding unit 207 of the second speaker apparatus 103 can decode the audio signal coded according to each of the coding methods of the MP3, the FLAC, the Ogg, and the WMA, whereas it cannot decode the audio signal coded according to each of the coding methods of the AAC and the WAV.

[1-4. Communication Method Correspondence Table]

Next, the communication method correspondence table stored in the storage unit 216 of the information processing apparatus 104 will be described.

FIG. 5 is a diagram indicating an example of the communication method correspondence table.

The communication method correspondence table is information indicating whether or not the speaker apparatuses (the first speaker apparatus 102 and the second speaker apparatus 103) can communicate according to each of the Bluetooth protocol (the first communication method) and the DLNA protocol (the second communication method).

In the communication method correspondence table in FIG. 5, the circle indicates that each of the first speaker apparatus 102 and the second speaker apparatus 103 can communicate according to the listed communication method. Furthermore, the x-mark indicates that each of the first speaker apparatus 102 and the second speaker apparatus 103 cannot communicate according to the listed communication method.

Specifically, the communication method correspondence table in FIG. 5 indicates that the first speaker apparatus 102 can communicate according to both the Bluetooth protocol and the DLNA protocol. Furthermore, the communication method correspondence table indicates that the second speaker apparatus 103 can communicate not according to the DLNA protocol but according to the Bluetooth protocol.

The decoding correspondence table and the communication method correspondence table are stored in the storage unit 216 when, for example, the information processing apparatus 104 authenticates an apparatus (detects a speaker apparatus) by communicating with the external storage 101, the first speaker apparatus 102, and the second speaker apparatus 103 in advance.

[1-5. Determination Criterion on Control]

Next, the determination criterion on whether the control unit 211 performs the first control or the second control will be described.

Under the first control, the control unit 211 needs to cause the decoding unit 213 to decode the audio signal to be reproduced, and the BT communication unit 212 to transmit the decoded audio signal to the speaker apparatus (one of the first speaker apparatus 102 and the second speaker apparatus 103).

Thus, in order that the control unit 211 performs the first control, it is necessary that (1) the coding method of the audio signal to be reproduced (target coding method) is a method in which the decoding unit 213 can decode the audio signal, and (2) the speaker apparatus selected by the user can communicate according to the Bluetooth protocol (the first communication method).

Similarly, under the second control, the control unit 211 causes the external storage 101 to directly transmit the audio signal to be reproduced to the speaker apparatus, and the speaker apparatus to decode the audio signal.

Thus, in order that the control unit 211 performs the second control, it is necessary that (1) the coding method of the audio signal to be reproduced (target coding method) is a method in which the speaker apparatus selected by the user can decode the audio signal, and (2) the speaker apparatus can communicate according to the DLNA protocol (the second communication method).

The control unit 211 can cause the speaker apparatus selected by the user to reproduce the audio signal when it can perform at least one of the first control and the second control based on the target coding method, the decoding compatibility information, and the communication compatibility information.

A table listing coding methods and whether or not the audio signal coded according to the listed coding method can be reproduced are shown in FIG. 6. FIG. 6 is a diagram indicating the table.

In FIG. 6, the circle indicates that the audio signal can be reproduced, whereas the x-mark indicates that the audio signal cannot be reproduced.

In the audio signal reproduction system 100, the first speaker apparatus 102 can reproduce the audio signals coded according to all the coding methods in FIG. 6. In contrast, the second speaker apparatus 103 cannot reproduce the audio signals coded according to the coding methods of the FLAC, the Ogg, and the WMA.

According to the DLNA protocol, device classes, for example, a server (digital media server abbreviated as DMS), a client (digital media player abbreviated as DMP or digital media renderer abbreviated as DMR), and a controller (digital media controller abbreviated as DMC) are defined in each device. In other words, a function corresponding to the device class is assigned to each device.

Specifically, the server (DMS) has a function of distributing a content item (audio signal) to clients (DMP and DMR), the client (DMP) has a function of detecting the content item in the server and reproducing the content item, and the client (DMR) has a function of only reproducing the content item.

The controller (DMC) has a function of controlling the server (DMS) and the clients (DMP and DMR), and instructs the server (DMS) to reproduce the content item so that the clients (DMP and DMR) can reproduce the content item.

According to Embodiment 1, the external storage 101 is defined as the DMS, the first speaker apparatus 102 is defined as the DMR, and the information processing apparatus 104 is defined as the DMC. Thus, the control unit 211 can perform the second control when the user selects the first speaker apparatus 102.

The second control can be performed in any communication method other than the DLNA protocol.

[2. Operations of Audio Signal Reproduction System]

[2-1. First Selection Example]

Next, operations of the audio signal reproduction system 100 will be described with reference to FIGS. 7 and 8.

Figure 7:
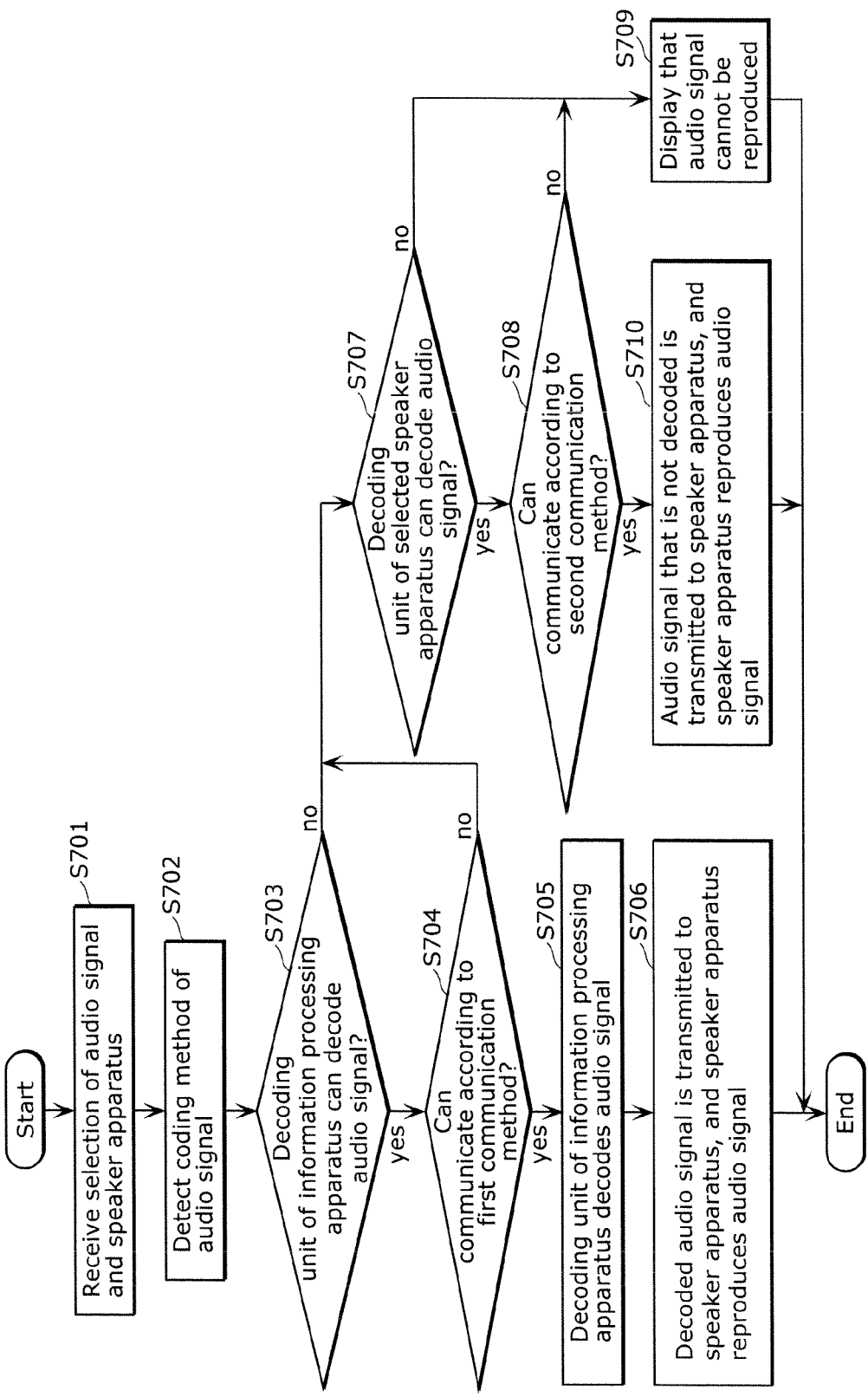
FIG. 7 is a flowchart of procedure for reproducing an audio signal according to Embodiment 1.

FIG. 7 is a flowchart of the operations of the audio signal reproduction system 100.

Figure 8:
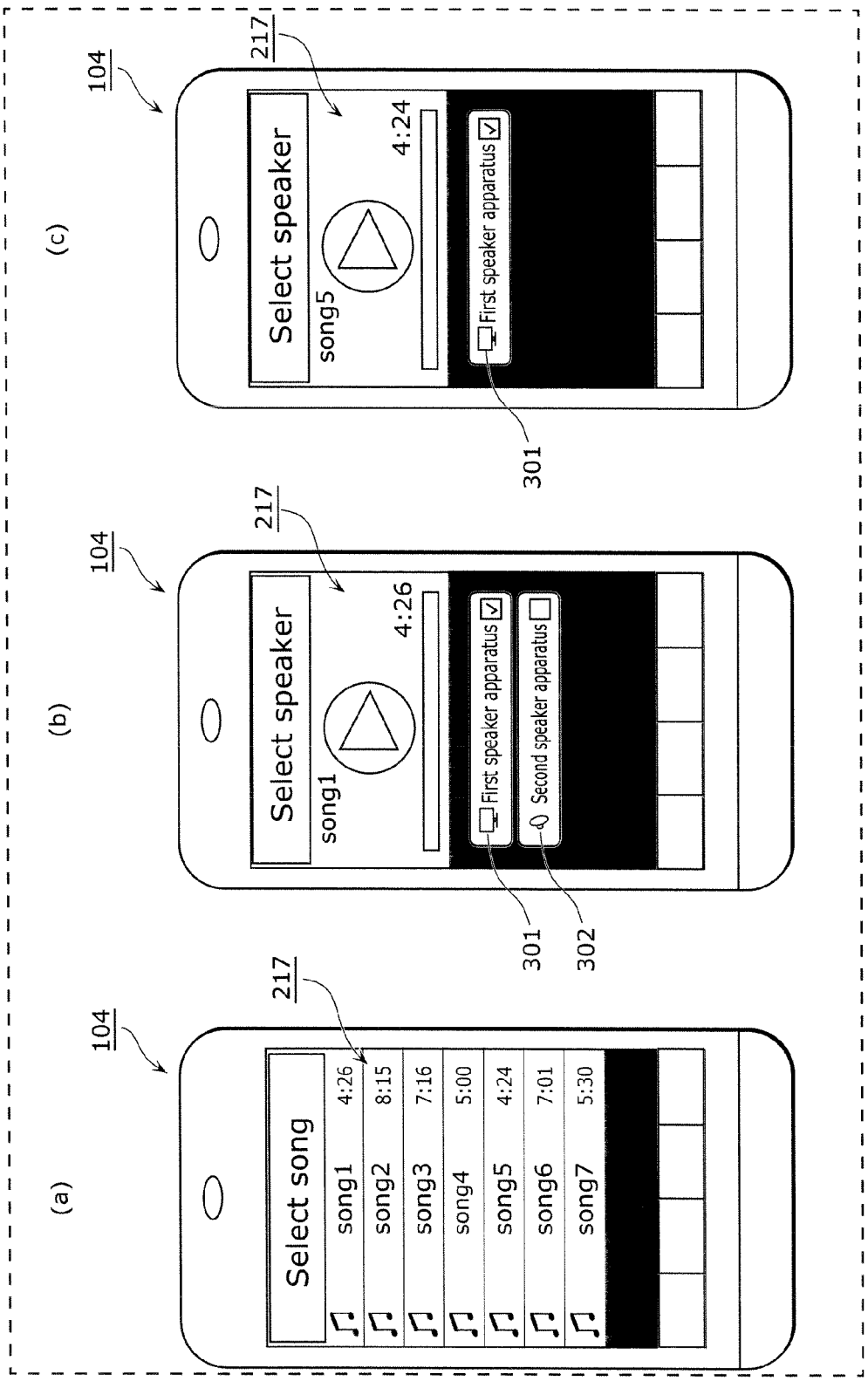
FIG. 8 illustrates selection screens displayed on a display unit of an information processing apparatus.

FIG. 8 illustrates selection screens displayed on the display unit 217 of the information processing apparatus 104.

The following describes four selection examples in which the audio signals and the speaker apparatuses selected by the user are different. The first selection example will be described hereinafter.

The input unit 214 receives a selection of an audio signal to be reproduced and a speaker apparatus that reproduces the audio signal (S701).

Here, the control unit 211 first communicates with the external storage 101 through the DLNA communication unit 210, and obtains the audio signal list indicated in FIG. 3. Then, the control unit 211 displays a tune selection screen on the display unit 217 based on the audio signal list.

The tune selection screen is a screen as illustrated in, for example, (a) of FIG. 8. The user selects the audio signal to be reproduced by touching the song title displayed on the display unit 217. Here, the user selects "song3" as the first selection example.

When the input unit 214 receives the selection of the audio signal to be reproduced by the user, the control unit 211 displays a speaker apparatus selection screen on the display unit 217. Specifically, the control unit 211 displays, on the display unit 217, icons illustrating speaker apparatuses that can communicate with the communication unit 218 (the DLNA communication unit 210 and the BT communication unit 212).

The speaker apparatus screen is a screen as illustrated in, for example, (b) of FIG. 8. As illustrated in (b) of FIG. 8, the speaker apparatus selection screen including an icon 301 indicating the first speaker apparatus 102 and an icon 302 indicating the second speaker apparatus 103 is displayed on the display unit 217. The icons 301 and 302 may be referred to as candidate speaker apparatuses.

The user selects a speaker apparatus from among the candidate speaker apparatuses by touching an icon displayed on the display unit 217. Here, the user selects the "First speaker apparatus".

Next, the detection unit 215 detects the coding method of the audio signal to be reproduced as the target coding method based on the audio signal list (S702). Since the user selects "song3" at Step S701, the detection unit 215 detects the "AAC" as the target coding method.

The control unit 211 may obtain only a song title of the audio signal through the DLNA communication unit 210 at Step S701, and obtain an audio signal list through the DLNA communication unit 202 at Step S702.

Next, the control unit 211 determines whether or not the decoding unit 213 of the information processing apparatus 104 can decode the audio signal coded according to the "AAC", with reference to the decoding correspondence table stored in the storage unit 216 (S703).

According to the decoding correspondence table in FIG. 4, the information processing apparatus 104 (the decoding unit 213) can decode the audio signal coded according to the "AAC" (Yes at S703).

Next, the control unit 211 determines whether or not the information processing apparatus 104 and the speaker apparatus selected by the user can communicate according to the first communication method (the Bluetooth protocol), with reference to the decoding correspondence table stored in the storage unit 216 (S704).

According to the communication method correspondence table in FIG. 5, the first speaker apparatus 102 can communicate with the information processing apparatus 104 according to the Bluetooth protocol (Yes at S704). When the speaker apparatus selected by the user cannot communicate according to the first communication method (No at S704), the operation at Step S707 is performed. The operation at Step S707 will be described in another selection example.

Next, the decoding unit 213 decodes the audio signal to be reproduced (S705). Specifically, the control unit 211 causes the DLNA communication unit 210 to communicate with the DLNA communication unit 202, and obtains "audio3.aac" that is a file of the audio signal corresponding to "song3" stored in the storage unit 201, from the external storage 101. In other words, the control unit 211 causes the DLNA communication unit 210 to obtain the audio signal to be reproduced from the external storage 101.

Then, the control unit 211 causes the decoding unit 213 of the information processing apparatus 104 to decode the obtained file of "audio3.aac". In other words, the control unit 211 causes the decoding unit 213 to decode the obtained audio signal.

Finally, the control unit 211 causes the BT communication unit 212 to communicate with the BT communication unit 206, and transmits the audio signal decoded by the decoding unit 213 to the first speaker apparatus 102. Then, the first speaker apparatus 102 outputs a sound corresponding to the reproduced audio signal from the sound output unit 205 (S706).

In the first selection example, the control unit 211 performs the first control in which the information processing apparatus 104 decodes by itself the audio signal to be reproduced and transmits the decoded audio signal to the speaker apparatus selected by the user. Under the first control, the speaker apparatus can reproduce the audio signal that cannot be decoded by the speaker apparatus. This is because the information processing apparatus 104 decodes the audio signal instead of the speaker apparatus, and transmits the decoded audio signal to the speaker apparatus.

[2-2. Second Selection Example]

Next, the second selection example will be described. In the second selection example, the user selects the "song5" as the audio signal to be reproduced, and the "First speaker apparatus" as the speaker apparatus.

First, the input unit 214 receives the selection of the "song5" and the "First speaker apparatus" (S701).

The detection unit 215 detects the "FLAC" that is the coding method corresponding to the "song5" as the target coding method based on the audio signal list (S702).

According to the decoding correspondence table in FIG. 4, the information processing apparatus 104 cannot decode the audio signal coded according to the "FLAC". Thus, the control unit 211 determines that the decoding unit 213 cannot decode the audio signal coded according to the "FLAC" (No at S703).

Next, the control unit 211 determines whether or not the decoding unit 204 of the first speaker apparatus 102 can decode the audio signal coded according to the "FLAC", with reference to the decoding correspondence table stored in the storage unit 216 (S707). According to the decoding correspondence table in FIG. 4, the first speaker apparatus 102 (the decoding unit 204) can decode the audio signal coded according to the "FLAC" (Yes at S707).

Next, the control unit 211 determines whether or not the external storage 101 and the speaker apparatus (the first speaker apparatus 102) selected by the user can communicate according to the second communication method (the DLNA protocol), with reference to the communication method correspondence table stored in the storage unit 216 (S708).

According to the communication method correspondence table in FIG. 5, the first speaker apparatus 102 can communicate with the external storage 101 according to the DLNA protocol (Yes at S708).

Next, the control unit 211 causes the DLNA communication unit 210 to communicate with the DLNA communication unit 202, and the external storage 101 to directly transmit to the first speaker apparatus 102 the "audio5.flac" that is the file of the audio signal corresponding to the "song5" stored in the storage unit 201. The first speaker apparatus 102 causes the decoding unit 204 to decode the "audio5.flac" obtained through the DLNA communication unit 203, and outputs a sound corresponding to the reproduced "audio5.flac" from the sound output unit 205 (S710). In other words, the control unit 211 causes the external storage 101 to directly transmit the audio signal to be reproduced to the first speaker apparatus 102, and the first speaker apparatus 102 to decode the audio signal.

In the second selection example, the control unit 211 performs the second control for causing the speaker apparatus selected by the user to decode the audio signal to reproduce the audio signal, without decoding the audio signal by itself.

Under the second control, the speaker apparatus selected by the user can reproduce the audio signal that cannot be decoded by the information processing apparatus 104.

[2-3. Third Selection Example]

Next, the third selection example will be described. In the third selection example, the user selects the "song1" as the audio signal to be reproduced, and the "Second speaker apparatus" as the speaker apparatus.

First, the input unit 214 receives the selection of the "song1" and the "Second speaker apparatus" (S701).

The detection unit 215 detects the "MP3" that is the coding method corresponding to the "song1" as the target coding method based on the audio signal list (S702).

According to the decoding correspondence table in FIG. 4, the information processing apparatus 104 can decode the audio signal coded according to the "MP3". Thus, the control unit 211 determines that the decoding unit 213 can decode the audio signal coded according to the "MP3" (Yes at S703).

Next, the control unit 211 determines whether or not the information processing apparatus 104 and the speaker apparatus selected by the user can communicate according to the first communication method, with reference to the communication method correspondence table stored in the storage unit 216 (S704).

According to the communication method correspondence table in FIG. 5, the second speaker apparatus 103 can communicate with the information processing apparatus 104 according to the Bluetooth protocol (Yes at S704).

Next, the decoding unit 213 decodes the audio signal to be reproduced (S705). Specifically, the control unit 211 causes the DLNA communication unit 210 to communicate with the DLNA communication unit 202, and obtains the "audio1.mp3" that is the file of the audio signal corresponding to the "song1" stored in the storage unit 201 from the external storage 101. Then, the control unit 211 causes the decoding unit 213 of the information processing apparatus 104 to decode the obtained file of the "audio1.mp3".

Finally, the control unit 211 causes the BT communication unit 212 to communicate with the BT communication unit 209, and transmits the audio signal decoded by the decoding unit 213 to the second speaker apparatus 103. Then, the second speaker apparatus 103 outputs a sound corresponding to the reproduced audio signal from the sound output unit 208 (S706).

In the third selection example, even when the external storage 101 cannot directly communicate with the speaker apparatus selected by the user, the speaker apparatus can reproduce the audio signal. This is because the information processing apparatus 104 obtains the audio signal from the external storage 101, decodes the obtained audio signal, and transmits the decoded audio signal to the speaker apparatus.

[2-4. Fourth Selection Example]

Next, the fourth selection example will be described. In the fourth selection example, the user selects the "song6" as the audio signal to be reproduced, and the "Second speaker apparatus" as the speaker apparatus.

First, the input unit 214 receives the selection of the "song6" and the "Second speaker apparatus" (S701).

The detection unit 215 detects the "Ogg" that is the coding method corresponding to the "song6" as the target coding method based on the audio signal list (S702).

According to the decoding correspondence table in FIG. 4, the information processing apparatus 104 cannot decode the audio signal coded according to the "Ogg". Thus, the control unit 211 determines that the decoding unit 213 cannot decode the audio signal coded according to the "Ogg" (No at S703).

Next, the control unit 211 determines whether or not the decoding unit 207 of the second speaker apparatus 103 can decode the audio signal coded according to the "Ogg", with reference to the decoding correspondence table stored in the storage unit 216 (S707). According to the decoding correspondence table in FIG. 4, the second speaker apparatus 103 (the decoding unit 207) can decode the audio signal coded according to the "Ogg" (Yes at S707).

Next, the control unit 211 determines whether or not the external storage 101 and the speaker apparatus selected by the user can communicate according to the second communication method (the DLNA protocol), with reference to the communication method correspondence table stored in the storage unit 216 (S708).

According to the communication method correspondence table in FIG. 5, the second speaker apparatus 103 cannot communicate with the external storage 101 according to the DLNA protocol (No at S708).

Finally, the control unit 211 performs a third control for displaying on the display unit 217 a message indicating that the second speaker apparatus cannot reproduce the "song6" (S709). The message is also displayed when the speaker apparatus selected by the user cannot decode the audio signal to be reproduced (No at S707).

In the fourth selection example, since the information processing apparatus 104 can perform neither the first control nor the second control, the speaker apparatus selected by the user cannot reproduce the audio signal. In such a case, the information processing apparatus 104 can convey a message indicating that the audio signal cannot be reproduced, by displaying the message on the display unit 217.

[3. Advantages and Others]

In summary, the speaker apparatus in the audio signal reproduction system 100 (the information processing apparatus 104) according to Embodiment 1 can easily reproduce the audio signal, without the user aware of whether or not the coding method of the audio signal is a method in which the speaker apparatus can decode the audio signal and the speaker apparatus can communicate with the external storage.

Furthermore, the user has to neither select an apparatus that decodes an audio signal to be reproduced nor select a communication method between the external storage, the information processing apparatus, and the speaker apparatus in the audio signal reproduction system 100.

Other Embodiments

Embodiment 1 is described as an example of the implementations of the present disclosure. Without being limited by this, the present disclosure is applicable to the embodiments obtained by appropriately changing, replacing, adding, and omitting Embodiment 1. Furthermore, combinations of the constituent elements described in Embodiment 1 allow implementation of new embodiments.

Here, the other embodiments will be briefly described hereinafter.

According to Embodiment 1, determining a coding method in which the information processing apparatus 104 can decode an audio signal (S703 in FIG. 7) and determining a coding method in which the speaker apparatus selected by the user can decode an audio signal (S707 in FIG. 7) are separately performed. However, if these coding methods are the same, the determining processes may be performed in one process.

According to Embodiment 1, whether or not the external storage 101 can communicate with the speaker apparatus selected by the user according to the second communication method (the DLNA protocol) (S708) is checked. However, if all the speaker apparatuses on a network can communicate with the external storage 101, the checking may be omitted.

Similarly, checking whether or not the information processing apparatus 104 can communicate with the speaker apparatus selected by the user according to the first communication method (the Bluetooth protocol) (S704) may be omitted.

In other words, the control unit 211 has only to perform the first control or the second control based on at least the target coding method and the decoding compatibility information (decoding correspondence table). Here, the communication compatibility information (the communication method correspondence table) is not essential.

Each of the control unit 211, the decoding unit 213 (the decoding units 204 and 207), and the detection unit 215 according to Embodiment 1 can be implemented by a programmable microcomputer. Furthermore, each of the control unit 211, the decoding unit 213, and the detection unit 215 be implemented by a hard logic or in any physical form.

In other words, each of the constituent elements according to Embodiment 1 may be implemented by dedicated hardware or by executing a software program appropriate for the constituent element. Each of the constituent elements may be implemented through a program executing unit, such as a central processing unit (CPU) and a processor, by reading and executing a software program recorded on a recording medium, such as a hard disk or a semiconductor memory.

Furthermore, although the audio signal is selected per song according to Embodiment 1, the user may select a playlist that is a list of songs that the user desires to play back.

Here, when one of the audio signals in the selected playlist is reproduced under the first control and the first control cannot be performed on the next audio signal, the control unit 211 can seamlessly reproduce the next audio signal by performing the second control.

In other words, the information processing apparatus 104 can continuously output a sound from the speaker apparatus, even when the coding method of the audio signal is changed during reproduction of the playlist.

Furthermore, when songs are not continuously played back according to a playlist but the user directly selects the next audio signal, the control unit 211 can seamlessly reproduce the next audio signal by switching between the first control and the second control.

Furthermore, although the communication method compatible with each of the speaker apparatuses is determined with reference to the communication method correspondence table stored in the storage unit 216 according to Embodiment 1, the information processing apparatus 104 may search for (detect) the speaker apparatus by communicating in the communication method.

For example, according to Embodiment 1, the BT communication unit 212 of the information processing apparatus 104 searches for the speaker apparatus that can communicate according to the Bluetooth protocol, thus detecting the first speaker apparatus 102 and the second speaker apparatus 103. Accordingly, the control unit 211 can determine that the first speaker apparatus 102 and the second speaker apparatus 103 can communicate according to the Bluetooth protocol, without referring to the communication method correspondence table.

Similarly, the DLNA communication unit 210 of the information processing apparatus 104 searches for the speaker apparatus that can communicate according to the DLNA protocol, and the control unit 211 can recognize that the first speaker apparatus 102 can communicate according to the DLNA protocol.

Furthermore, since the first speaker apparatus 102 can communicate according to the first and second communication methods, it is recognized as two speaker apparatuses in processing data. In other words, the first speaker apparatus 102 that can communicate according to the first and second communication methods is handled as two speaker apparatuses in processing data.

Here, the control unit 211 may perform a control in which when the first speaker apparatus 102 can reproduce the audio signal under both the first control and the second control, an icon indicating the first speaker apparatus 102 as a candidate speaker apparatus is displayed on the display unit 217.

Accordingly, only the icon 301 indicating the first speaker apparatus 102 is displayed on the display unit 217 as illustrated in (c) of FIG. 8. Thus, the user can comfortably enjoy music without being aware of the communication method.

Although Embodiment 1 exemplifies the coding methods of the MP3, the AAC, the WAV, the FLAC, the Ogg, and the WMA, other coding methods may be used.

Furthermore, although Embodiment 1 exemplifies the coding methods of the Bluetooth protocol and the DLNA protocol, other wireless communication methods including AirPlay® (proprietary streaming technology uniquely developed by Apple Inc.) may be used.

Although the detection unit 215 detects a coding method based on the decoding correspondence table, the detection unit 215 may detect a coding method based on an extension of a file name or data in a file.

At Step S701 in the processes performed by the audio signal reproduction system 100 according to Embodiment 1 (FIG. 7), the control unit 211 displays on the display unit 217 icons indicating all the speaker apparatuses that can communicate with the communication unit 218 as candidate speaker apparatuses so that the user can select one of the speaker apparatuses.

However, only an icon indicating the speaker apparatus that can reproduce the audio signal may be displayed on the display unit 217 as a candidate speaker apparatus.

Figure 9:
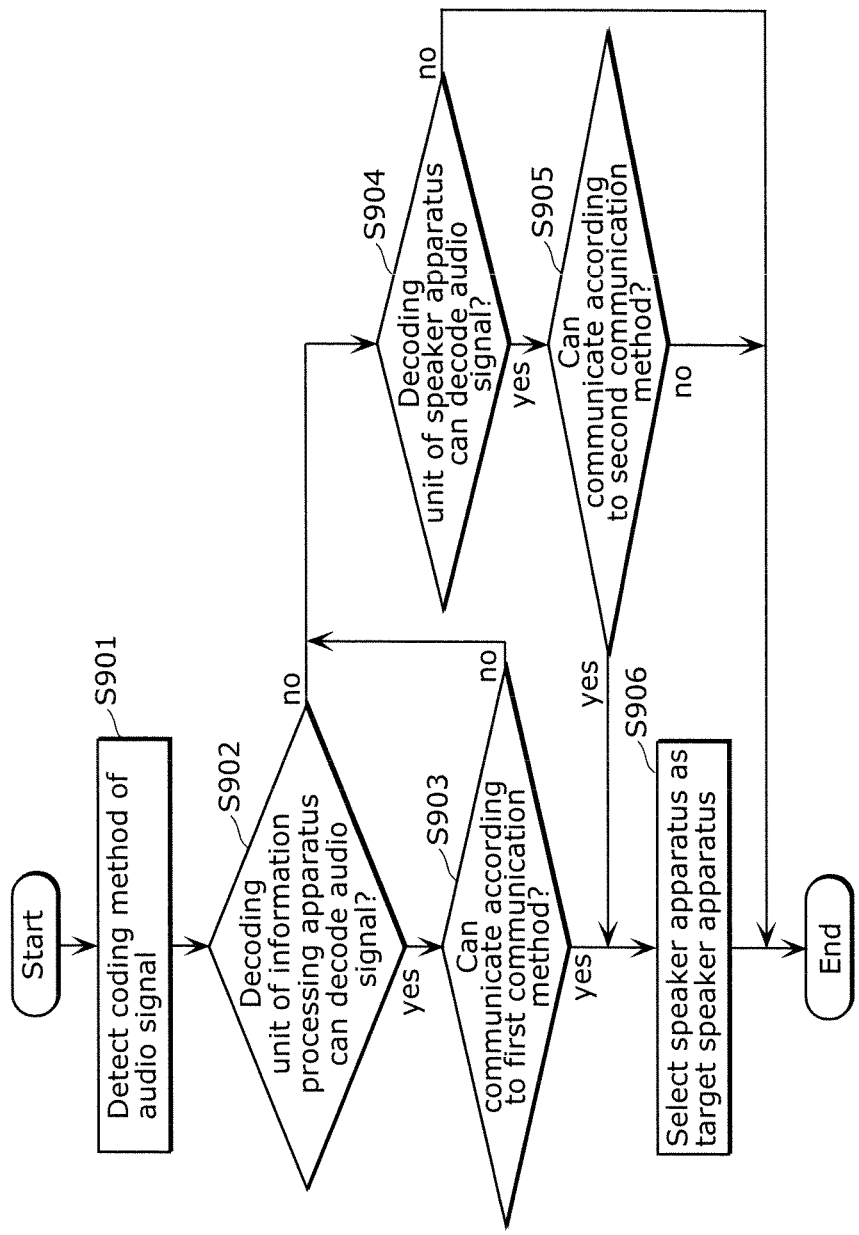
FIG. 9 is a flowchart of operations for selecting a speaker apparatus capable of reproducing an audio signal.

FIG. 9 is a flowchart of operations for selecting a speaker apparatus capable of reproducing an audio signal.

The operations of the flowchart in FIG. 9 are performed as part of the processes in Step S701 of the flowchart in FIG. 7. Specifically, the operations are performed after the input unit 214 receives a selection of an audio signal and before the input unit 214 receives a selection of a speaker apparatus.

Furthermore, each of the speaker apparatuses that can communicate with the information processing apparatus 104 performs the operations of the flowchart in FIG. 9.

First, after the input unit 214 receives a selection of an audio signal to be reproduced, the detection unit 215 detects the coding method of the audio signal as the target coding method (S901).

Next, the control unit 211 determines whether or not the decoding unit 213 of the information processing apparatus 104 can decode the audio signal according to the target coding method, with reference to the decoding correspondence table stored in the storage unit 216 (S902).

When the target coding method is a method in which the decoding unit 213 of the information processing apparatus 104 can decode the audio signal (Yes at S902), the control unit 211 determines whether or not the speaker apparatus can communicate according to the first communication method (S903).

When the speaker apparatus can communicate according to the first communication method (Yes at S903), the speaker apparatus is selected as the target speaker apparatus (S906).

When the speaker apparatus cannot communicate according to the first communication method (No at S903), the control unit 211 determines whether or not the speaker apparatus can decode the audio signal to be reproduced (S904). When the speaker apparatus cannot decode the audio signal (No at S904), the speaker apparatus is not selected as the target speaker apparatus.

When the speaker apparatus can decode the audio signal (Yes at S904), the control unit 211 determines whether or not the speaker apparatus can communicate according to the second communication method (S905). When the speaker apparatus cannot communicate according to the second communication method (No at S905), the speaker apparatus is not selected as the target speaker apparatus.

When the speaker apparatus can communicate according to the second communication method (Yes at S905), the speaker apparatus is selected as the target speaker apparatus (S906).

After selecting all the speaker apparatuses that can communicate with the information processing apparatus 104 through the flowchart in FIG. 9, the control unit 211 displays all the icons of the selected target speakers on the display unit 217 as candidate speaker apparatuses.

For example, when the audio signal to be reproduced is coded according to the "FLAC", not the second speaker apparatus 103 but the first speaker apparatus 102 can reproduce the audio signal. Thus, as illustrated in (c) of FIG. 8, the control unit 211 displays only the icon 301 indicating the first speaker apparatus 102 on the display unit 217.

The input unit 214 receives the selection of the speaker apparatus (candidate speaker apparatus). Then, the operations after Step S702 in FIG. 7 will be performed.

Since the speaker apparatus selected by the user always reproduces the audio signal to be reproduced, the user can comfortably enjoy music.

Furthermore, in FIG. 7, whether or not the first control can be performed is first determined, and whether or not the second control can be performed is next determined. Specifically, the control unit 211 determines whether or not the current state falls under the first case where the decoding compatibility information indicates that the target coding method is a method in which the decoding unit 213 can decode an audio signal and the communication compatibility information indicates that the speaker apparatus selected by the user can communicate according to the first communication method. When the current state falls under the first case, the control unit 211 performs the first control. When the current state does not fall under the first case, the control unit 211 determines whether or not the current state falls under the second case where the decoding compatibility information indicates that the target coding method is a method in which the speaker apparatus selected by the user can decode an audio signal and the communication compatibility information indicates that the speaker apparatus can communicate according to the second communication method. When the current state falls under the second case, the control unit 211 performs the second control.

However, whether or not the second control can be performed may be first determined, and whether or not the first control can be performed may be next determined. In other words, the control unit 211 may first determine whether or not the current state falls under the second case, and perform the second control if in the second case. If not, the control unit 211 may determine whether or not the current state falls under the first case, and perform the first control if in the first case.

Furthermore, the control unit 211 may prioritize any of the first and second controls when determining that it can perform both of the controls.

Figure 10:
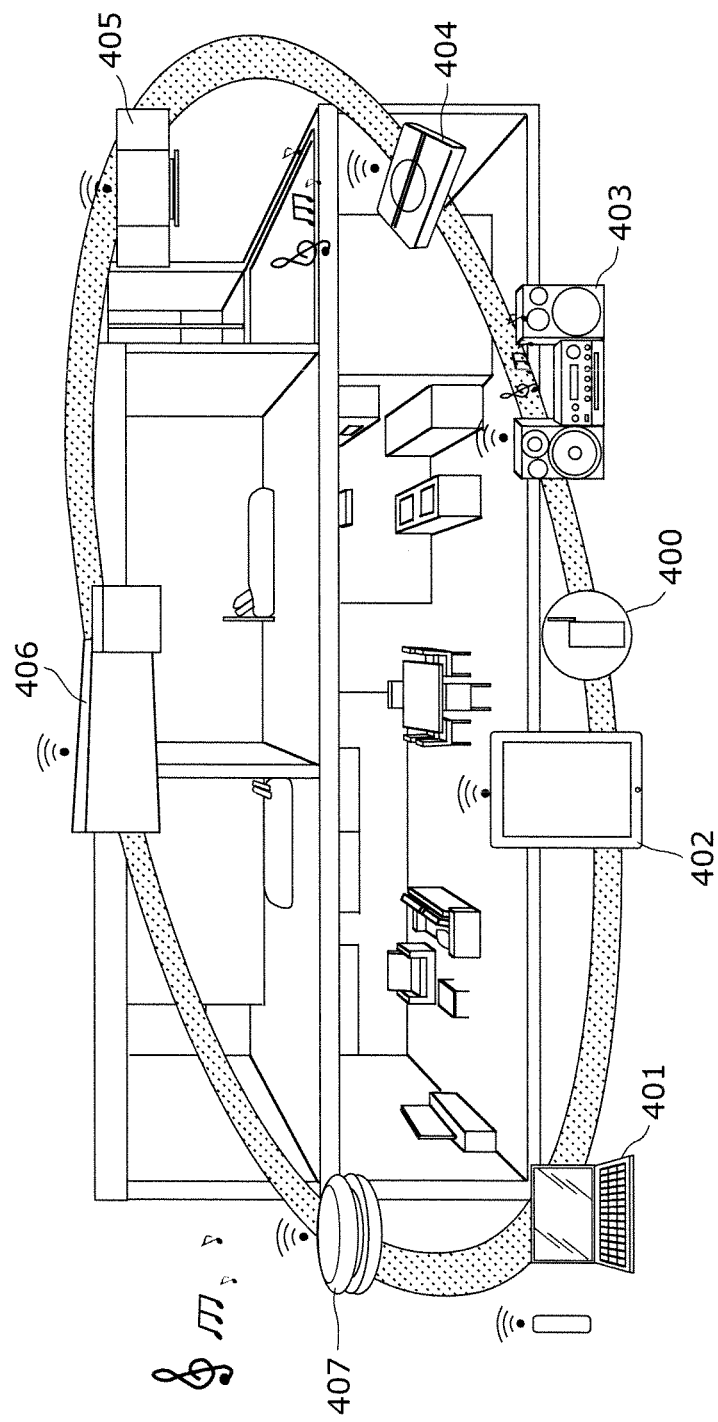
FIG. 10 illustrates an application of an audio signal reproduction system.

The audio signal reproduction system 100 according to the present disclosure includes apparatuses connected to a network via a wireless rooter 400 in a home as illustrated in, for example, FIG. 10.

For example, a PC 401 in FIG. 10 may be used as an external storage, and a tablet 402 may be used as an information processing apparatus. Here, the user can play back the audio signal stored in the PC 401 through a stereo component system 403 and network speakers 404 to 407 that are placed in various places in the home, using the tablet 402.

Embodiment 1 and the other embodiments that the Applicant considers to be the best mode are provided with the attached drawings and the detailed description. These are provided to the persons skilled in the art to exemplify the subject matter of the claimed invention by referring to the specific embodiments.

Thus, the constituent elements described in the attached drawings and the detailed description may include at least the essential ones for solving the problems. In other words, the detailed description and the attached drawings may include non-essential constituent elements. Furthermore, various changes, replacement, addition, and omission may be performed within the scope of the claims or the equivalents.

Although the present invention has been described and illustrated in detail, it is clearly understood that the same is by way of example only and is not to be taken by way of limitation, the scope of the present invention being limited only by the terms of the appended claims.

INDUSTRIAL APPLICABILITY

The present disclosure is effectively applicable to audio signal reproduction systems using wireless communication among apparatuses.

The invention claimed is:

1. An information processing apparatus that controls reproduction of an audio signal through a speaker apparatus having a function of decoding the audio signal, the audio signal being stored in an external storage, the information processing apparatus comprising:
   a detection unit configured to detect a coding method of the audio signal as a target coding method;
   a decoding unit configured to decode the audio signal;
   a storage unit in which decoding compatibility information is stored, the decoding compatibility information indicating whether or not the target coding method is a method in which each of the decoding unit and the speaker apparatus can decode the audio signal;
   a communication unit configured to communicate with the external storage and the speaker apparatus; and
   a control unit configured to select one of a first control and a second control based on the target coding method and the decoding compatibility information, and perform the selected one of the first control and the second control, the first control being for causing: the communication unit to obtain the audio signal from the external storage; the decoding unit to decode the obtained audio signal; and the communication unit to transmit the decoded audio signal to the speaker apparatus, the second control being for causing: the external storage to directly transmit the audio signal to the speaker apparatus; and the speaker apparatus to decode the audio signal.

2. The information processing apparatus according to claim 1,
   wherein the control unit is configured to perform:
   the first control when the decoding compatibility information indicates that the target coding method is the method in which the decoding unit can decode the audio signal; and
   the second control when the decoding compatibility information indicates that the target coding method is (i) a method in which the decoding unit cannot decode the audio signal and (ii) the method in which the speaker apparatus can decode the audio signal.

3. The information processing apparatus according to claim 1,
wherein the control unit is configured to perform the first control when the decoding compatibility information indicates that the target coding method is the method in which the decoding unit and the speaker apparatus can decode the audio signal.

4. The information processing apparatus according to claim 1,
wherein the control unit is configured to perform the second control when the decoding compatibility information indicates that the target coding method is the method in which the decoding unit and the speaker apparatus can decode the audio signal.

5. The information processing apparatus according to claim 1,
wherein the communication unit is configured to communicate according to:
a first communication method so that the communication unit transmits the decoded audio signal to the speaker apparatus under the first control; and
a second communication method so that the external storage directly transmits the audio signal to the speaker apparatus under the second control,
communication compatibility information is further stored in the storage unit, the communication compatibility information indicating whether or not the speaker apparatus can communicate according to each of the first communication method and the second communication method, and
the control unit is configured to select one of the first control and the second control based on the target coding method, the decoding compatibility information, and the communication compatibility information, and perform the selected one of the first control and the second control.

6. The information processing apparatus according to claim 5,
wherein the control unit is configured to perform the first control when the communication compatibility information indicates that the target coding method is the method in which both the decoding unit and the speaker apparatus can decode the audio signal and that the speaker apparatus can communicate according to both the first communication method and the second communication method.

7. The information processing apparatus according to claim 5,
wherein the control unit is configured to perform the second control when the communication compatibility information indicates that the target coding method is the method in which both the decoding unit and the speaker apparatus can decode the audio signal and that the speaker apparatus can communicate according to both the first communication method and the second communication method.

8. The information processing apparatus according to claim 5, further comprising:
an input unit configured to receive a selection of the speaker apparatus by a user; and
a display unit,
wherein the speaker apparatus is one speaker apparatus selected by the user through the input unit from among candidate speaker apparatuses displayed on the display unit, and the control unit is configured to perform a control for:
selecting a speaker apparatus that can communicate according to the first communication method or that can decode the audio signal and communicate according to the second communication method, from among speaker apparatuses that can communicate with the communication unit, based on the decoding compatibility information and the communication compatibility information, and displaying an icon indicating the selected speaker apparatus as one of the candidate speaker apparatuses on the display unit, when the decoding compatibility information indicates that the target coding method is the method in which the decoding unit can decode the audio signal; and
selecting a speaker apparatus that can decode the audio signal and communicate according to the second communication method from among the speaker apparatuses based on the decoding compatibility information and the communication compatibility information, and displaying an icon indicating the selected speaker apparatus as an other one of the candidate speaker apparatuses on the display unit, when the decoding compatibility information indicates that the target coding method is a method in which the decoding unit cannot decode the audio signal.

9. The information processing apparatus according to claim 8,
wherein the control unit is configured to, when the speaker apparatus can reproduce the audio signal under both the first control and the second control, perform a control for displaying a common icon indicating the speaker apparatus as one of the candidate speaker apparatuses on the display unit.

10. The information processing apparatus according to claim 8,
wherein the control unit is configured to, when the control unit cannot perform any one of the first control and the second control, perform a control for displaying that the control unit cannot perform any one of the first control and the second control on the display unit.

11. The information processing apparatus according to claim 1, further comprising:
an input unit configured to receive a selection of the speaker apparatus by a user; and
a display unit,
wherein the speaker apparatus is one speaker apparatus selected by the user through the input unit from among candidate speaker apparatuses displayed on the display unit, and
the control unit is configured to perform a control for displaying icons indicating speaker apparatuses that can communicate with the communication unit as corresponding ones of the candidate speaker apparatuses on the display unit.

12. The information processing apparatus according to claim 1,
wherein the first communication method is wireless communication using a Bluetooth® protocol, and
the second communication method is wireless communication using a DLNA® protocol.

13. The information processing apparatus according to claim 1, wherein the decoded audio signal resulting from the decoding by the decoding unit requires no further decoding regarding an audio data format at the speaker apparatus.

14. A control method for reproducing an audio signal through a speaker apparatus having a function of decoding the audio signal, the audio signal being stored in an external storage, the control method being performed by an information processing apparatus, wherein the information processing apparatus can communicate with the external storage and the speaker apparatus, and includes a storage unit in which decoding compatibility information is stored, the decoding compatibility information indicating whether or not the target coding method is a method in which each of the decoding unit and the speaker apparatus can decode the audio signal, the control method comprising selecting one of a first control and a second control based on the target coding method and the decoding compatibility information, and performing the selected one of the first control and the second control, the first control being for obtaining the audio signal from the external storage; decoding the obtained audio signal; and transmitting the decoded audio signal from the information processing apparatus to the speaker apparatus, the second control being for causing: the external storage to directly transmit the audio signal to the speaker apparatus; and the speaker apparatus to decode the audio signal.

15. A non-transitory computer-readable recording medium on which a program is recorded, the program causing a computer to execute the control method according to claim 14.

* * * * *